United States Patent
Flavell et al.

[11] Patent Number: 5,240,299
[45] Date of Patent: Aug. 31, 1993

[54] ROBOT END EFFECTOR

[75] Inventors: John Flavell, Coventry; Keith Jeffcoat, Nuneaton, both of United Kingdom

[73] Assignee: Courtaulds Textiles (Holdings) Limited, Manchester, United Kingdom

[21] Appl. No.: 678,287

[22] PCT Filed: Oct. 3, 1989

[86] PCT No.: PCT/GB89/01170
§ 371 Date: Apr. 3, 1991
§ 102(e) Date: Apr. 3, 1991

[87] PCT Pub. No.: WO90/03740
PCT Pub. Date: Apr. 19, 1990

[30] Foreign Application Priority Data
Oct. 4, 1988 [GB] United Kingdom ............... 8823267

[51] Int. Cl.⁵ .......................... B25J 11/00; B66C 1/44
[52] U.S. Cl. .................... 294/99.1; 294/902; 901/30
[58] Field of Search ............. 294/99.1, 64.1, 902, 294/1.1; 901/30, 40

[56] References Cited
U.S. PATENT DOCUMENTS

| 3,377,096 | 4/1968 | Wood | 294/64.1 |
| 3,627,369 | 12/1971 | Nixon | 294/64.1 |
| 4,389,064 | 6/1983 | Laverrire | 294/64.1 |
| 4,639,030 | 1/1987 | Bini | 294/64.1 |
| 5,018,773 | 5/1991 | Stavin et al. | 294/1.1 |

FOREIGN PATENT DOCUMENTS 0112116 6/1984 European Pat. Off.
1485279 10/1969 Fed. Rep. of Germany.
WO8603948 7/1986 PCT Int'l Appl.

Primary Examiner—David M. Mitchell
Assistant Examiner—Dean J. Kramer
Attorney, Agent, or Firm—Davis Hoxie Faithfull & Hapgood

[57] ABSTRACT

A robot end effector (10) for holding a fabric workpiece (64) against a working surface (74) has a rigid backing member (11), a facing strip material (13) arranged to contact the workpiece (64) around its periphery and a resilient intermediate layer (12) between the backing member (11) and the facing strip material (13), the width (w) of the facing strip material (13) being no greater than the thickness (t) of the intermediate layer (12).

14 Claims, 5 Drawing Sheets

ROBOT END EFFECTOR

BACKGROUND OF THE INVENTION

This invention relates to a robot end effector for pressing flexible workpieces, e.g. of fabric, onto and moving such workpieces over, a flat working surface.

A known robot end effector is shown in WO 86/03948 and comprises a sandwich construction consisting of a backing sheet, a facing sheet for gripping the workpiece and a resilient intermediate layer for accommodating irregularities, such as seams or unequal multi-;lies of fabric parts in subassemblies and local imperfections in the working surface. The backing sheet is U-shaped and the resilient intermediate layer and facing sheet are similarly shaped. In addition the thickness of the intermediate layer is less than the width of the facing sheet which has a relatively large surface area. Although this known end effector performs adequately for its predetermined task, i.e. gripping a workpiece during an unfolding operation and moving the workpiece along a defined path, its relative bulk renders it unsuitable for performing movements at the highest speeds required for modern processing.

It may be considered desirable for a sandwich construction end effector to have its backing sheet, facing sheet and intermediate layer all of the same size as a workpiece to be manoeuvred. However, this may result in the end effector being too bulky and having too high an inertia for effective, speedy manoeuvering. Furthermore, such a "solid" construction will result in air disturbance as an end effector is moved down on to a workpiece which will cause the latter to be displaced prior to contact between the effector and workpiece if the speed of movement of the end effector is not to be reduced to a slow approach.

The weight of an end effector can be reduced by only contacting a workpiece around its periphery. This is achieved by employing peripheral strips of facing sheet. When employing only strips of facing sheet the form of the resilient intermediate layer is important. Ideally it should be easily compressed, e.g. made of a soft foam material. However such easily compressed material tends to undergo shearing movement as the end effector moves a workpiece over a work surface. To some extent this tendency of the intermediate layer to undergo shearing movement can be counteracted by increasing the width of the intermediate layer. Such a solution is shown in WO 86/03948 in which the width of each strip of intermediate layer is considerably greater than its thickness. However this increased width of the strip-form intermediate layer increases the bulk of the end effector.

The present invention seeks to provide an improved form of robot end effector having a sandwich construction.

SUMMARY OF THE INVENTION

According to the present invention a robot end effector comprising a rigid backing member, facing strip material arranged to contact a workpiece around, or adjacent to, the periphery of the workpiece and a resilient intermediate layer between the backing member and the facing strip material, is characterised in that the width of the facing strip material is no greater than the thickness of the intermediate layer.

Conveniently the resilient intermediate layer requires a force of from 80-120 kg/m², to compress it 1 mm. Typically the intermediate layer is a foam material, e.g. a polyurethane foam such as that marketed by Dunlopillo under the trade name "DHR 264 Dunloflex'-'—i.e. a high resilient grade polyurethane foam.

Typically the resilient intermediate layer has a thickness of from 20 mm to 30 mm, e.g. 25 mm. Typically the facing strip material has a width of less than 20 mm, e.g. 15 mm.

Suitably the width of the intermediate layer where it is adjoined to the backing plate is greater than the width of the intermediate layer where it is adjoined to the facing strip material. Conveniently, for the peripheral lengths of facing strip material, the intermediate layer has a cross-section such that its inwardly facing side is at an angle, e.g. 45°, to the backing plate. If the end effector is provided with inner lengths of strip material (i.e. lengths disposed inwardly of the peripheral lengths) or outer lengths of strip material (i.e. lengths disposed outwardly of peripheral lengths positioned slightly inwardly of a workpiece periphery), the intermediate layer may have a cross-section of trapezoidal form, the two faces being disposed at equal angles, e.g. 45°, to the backing plate.

Preferably the end effector is provided with a plurality of window-like apertures.

Conveniently the rigid backing plate comprises a lightweight composite panel such as an aluminum honeycomb structure sandwiched between facing sheets, e.g. of aluminum. An example of such material is 0.5 inch (12.5 mm) thick "Aerolam". The backing plate material should be chosen for its rigidity and lightness.

The facing sheet conveniently comprises an electrically conductive sheet, e.g. electrically conductive rubber sheet, typically having a thickness of approximately 1 mm.

Suitably weights are provided around the periphery of the end effector.

BRIEF DESCRIPTION OF THE DRAWINGS

Embodiments of the invention will now be described, by way of example, with reference to the accompanying drawings, in which.

DESCRIPTION OF PREFERRED EMBODIMENTS

Figure 1:
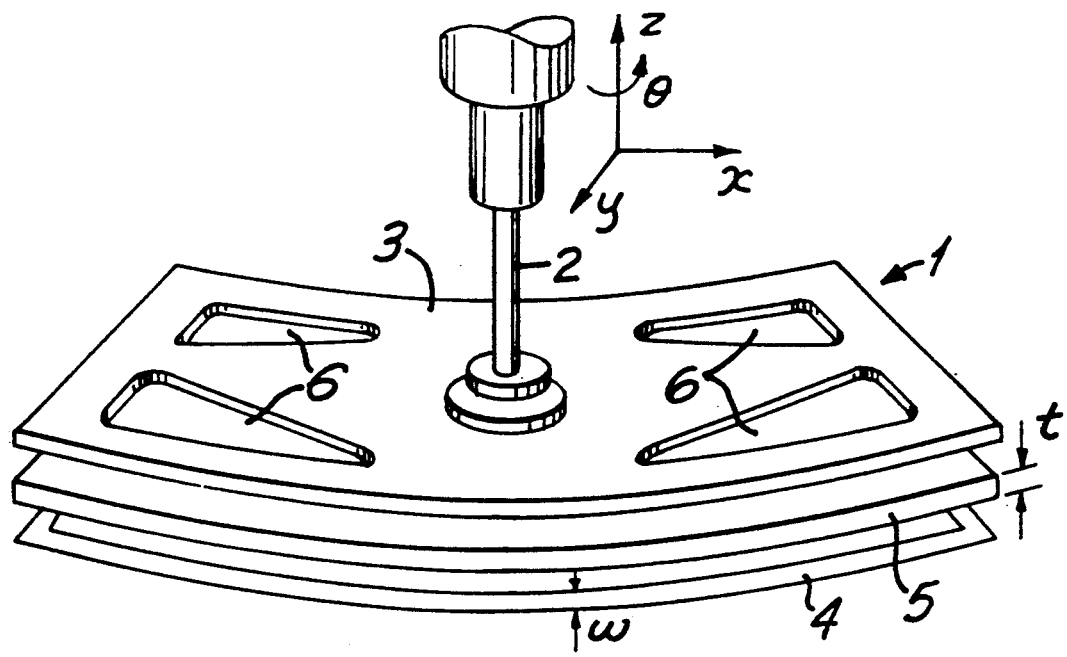
FIG. 1 is a schematic exploded view of a first embodiment of a robot end effector according to the invention attached to a robot arm.

FIG. 1 shows one embodiment of a robot end effector 1 according to the invention attached to the end of a robot arm 2. The robot arm 2 can be rotated and moved in x, y, z and θ directions. The end effector 1 comprises a rigid backing member 3, facing strip material 4 for contacting a workpiece to slide it across a horizontal work surface and a resilient intermediate layer 5. The member 3 has window-like openings 6 formed therein to enable escape of air as the end effector 1 is lowered onto a workpiece supported on a work surface. The width w of the strip material 4 is less than the thickness t of the intermediate layer 5.

Figure 3:
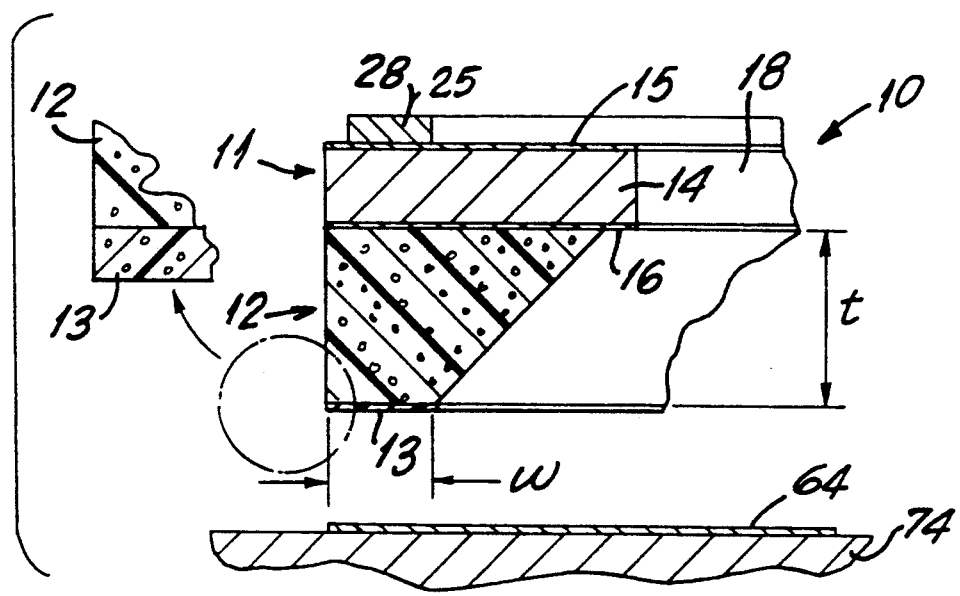
FIG. 3 is a sectional view, on an enlarged scale, taken on the line III—III of FIG. 2.
Figure 2:
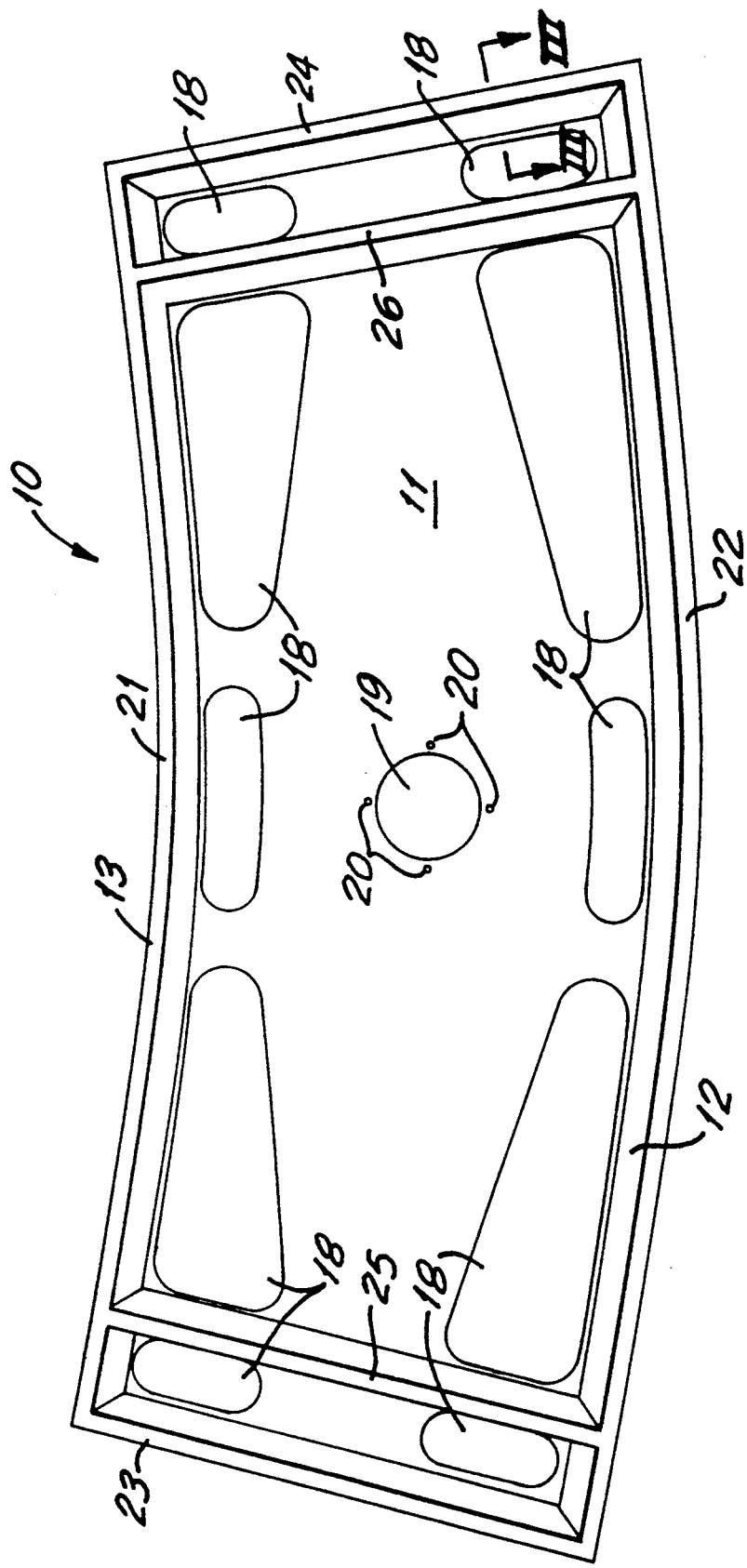
FIG. 2 is a view from below of a second embodiment of a robot end effector according to the invention.

FIGS. 2 and 3 show the construction of another embodiment of robot end effector 10 in greater detail. The end effector 10 is intended for handling or gripping three different sizes of waist slip fabric having different waist perimeters but the same depth or length. The end effector 10 comprises a lightweight, rigid backing plate 11, a resilient intermediate layer 12 and a facing sheet 13 of strip like form bonded together to provide a sandwich construction. The backing plate 11 is typically 0.5 inch (12.5 mm) thick and of composite form comprising a cellular, e.g. honeycomb, structure 14 sandwiched between facing sheets 15 and 16. A suitable material for the backing plate 11 is sold under the trade name "Aerolam" and consists of an aluminum honeycomb structure sandwiched between aluminum facing sheets. The resilient intermediate layer 12 suitably comprises a high resilient grade polyurethane foam typically having a thickness of from 20 mm to 30 mm, e.g. 25 mm. A suitable foam material is marketed by Dunlopillo under the trade name "DHR 264 Dunloflex". As can be seen from FIG. 3, the intermediate layer 12 has a trapezoidal cross-section with its inwardly facing surface angled at an inclined angle (e.g. 45°) to the backing plate 11. The purpose of this angling is to increase the resistance of the layer 12 to withstand a shearing movement during traverse of the end effector 10 across a work surface. The facing sheet 13 is conventionally an electrically conductive flexible sheet of friction material, e.g. a rubber sheet containing electrically conductive particles. By using an electrically conductive sheet 13, static electricity is effectively discharged. The sheet 13 typically has a thickness of 1 mm and each strip has a width (w) no more than 20 mm, e.g. 15 mm. Thus the width of each strip of the sheet 13 is no greater than the thickness (t) of the intermediate layer 12.

The backing plate 11 has a plurality of window-like openings 18 formed therein to allow escape of air as the end effector 10 is lowered towards a workpiece 64 supported on a flat working surface 74. A mounting hole 19 is also formed in the plate 11 to enable the end effector 10 to be secured to the end of a robot arm (not shown) with the aid of bolts (not shown) entered into holes 20.

The intermediate layer 12 and facing sheet 13 are arranged stripwise around the entire periphery of the backing plate 11 along top and bottom regions 21 and 22, respectively, and along side regions 23 and 24. Two further strips are spaced inwardly of the side regions 23 and 24 along regions 25 and 26, respectively. In use the regions 25 and 26 are used for manoeuvering a "small" size waist slip workpiece, the regions 23 and 24 are used for manoeuvering a "large" size waist slip workpiece and regions 23 and 26 (or regions 24 and 25) are used for manoeuvering a "medium" size waist slip.

Intermediate layer 12 has at least one void space therein between backing plate 11 and the plane containing facing sheet 13. Referring to FIG. 2, for example, void spaces are shown, bounded by (a) regions 23 and 25 and portions of top and bottom regions 21 and 22, respectively, (b) regions 25 and 26 and portions of top and bottom regions 21 and 22, respectively, and (c) regions 24 and 26 and portions of top and bottom regions 21 and 22, respectively.

The end effector 10 has a weight of 2.2 kg and the total surface area of the facing sheet 13 is 64200 mm². The extra load on the end effector 10 due to the robot coupling is 0.2 kg. In order to obtain efficient workpiece control an extra load of 2.25 kg requires to be applied to the end effector 10. In theory this loading could be applied to the end effector by means of the robot arm. However this centrally applied loading would tend to bend the entire end effector. The preferred method of loading the end effector 10 is therefore to apply weights 28 around the entire periphery of the upper surface of the backing plate 11. With the weights 28 added, the load/unit area of the facing sheet 13 is 72.4 kg/m².

Figure 4:
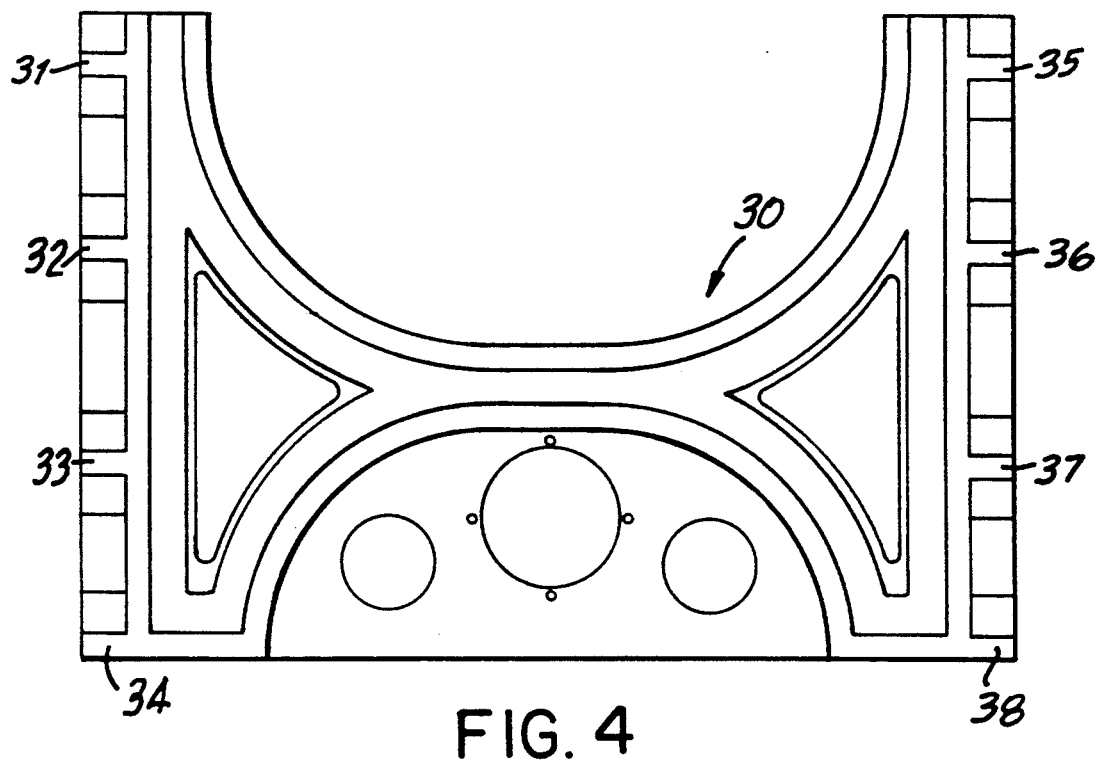
FIG. 4 is a view from below of a third embodiment of a robot end effector according to the invention.
Figure 5:
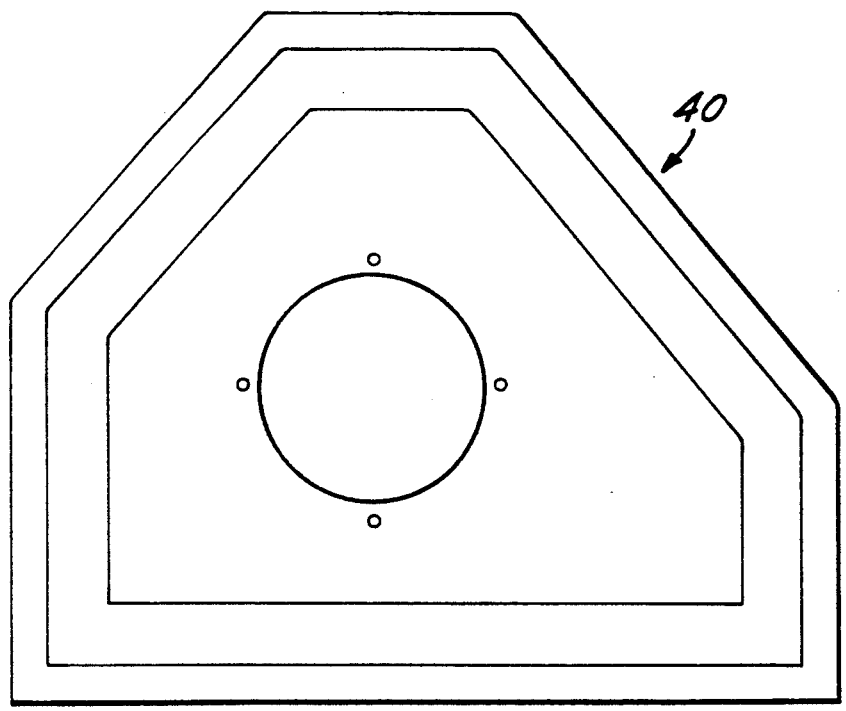
FIG. 5 is a view from below of a fourth embodiment of a robot end effector according to the invention.
Figure 6:
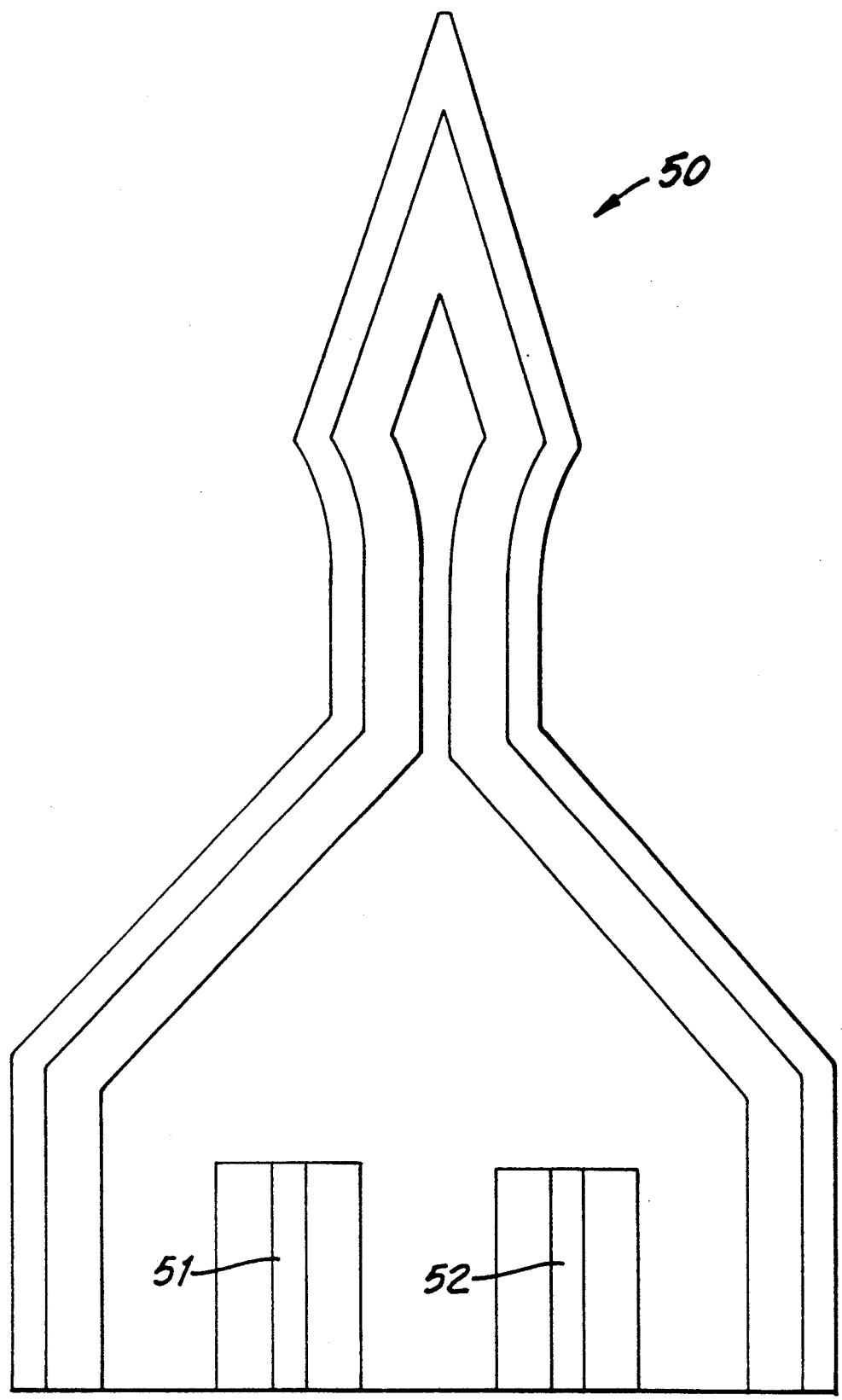
FIG. 6 is a view from below of a fifth embodiment of a robot end effector according to the invention.

Other designs of robot end effectors 30, 40 and 50 for differently shaped workpieces are shown in FIGS. 4, 5 and 6, respectively. The end effectors 30, 40 and 50 are basically similar in construction to the end effector 10 and where appropriate similar parts have been identified by similar reference numerals. In the end effector 40 window-like apertures are not shown and, in the end effector 50, window-like apertures and a mounting aperture are not shown. In practice, however, such apertures would be provided.

The main additional features of the end effectors 30 and 50 are the strips 31–38 in end effector 30 and the strips 51 and 52 in the end effector 50. These strips enable different sizes of workpiece to be gripped. For example, with end effector 30, the strips 31–38 would be employed to grip a workpiece at spaced locations along side edges of the workpiece.

Figure 7:
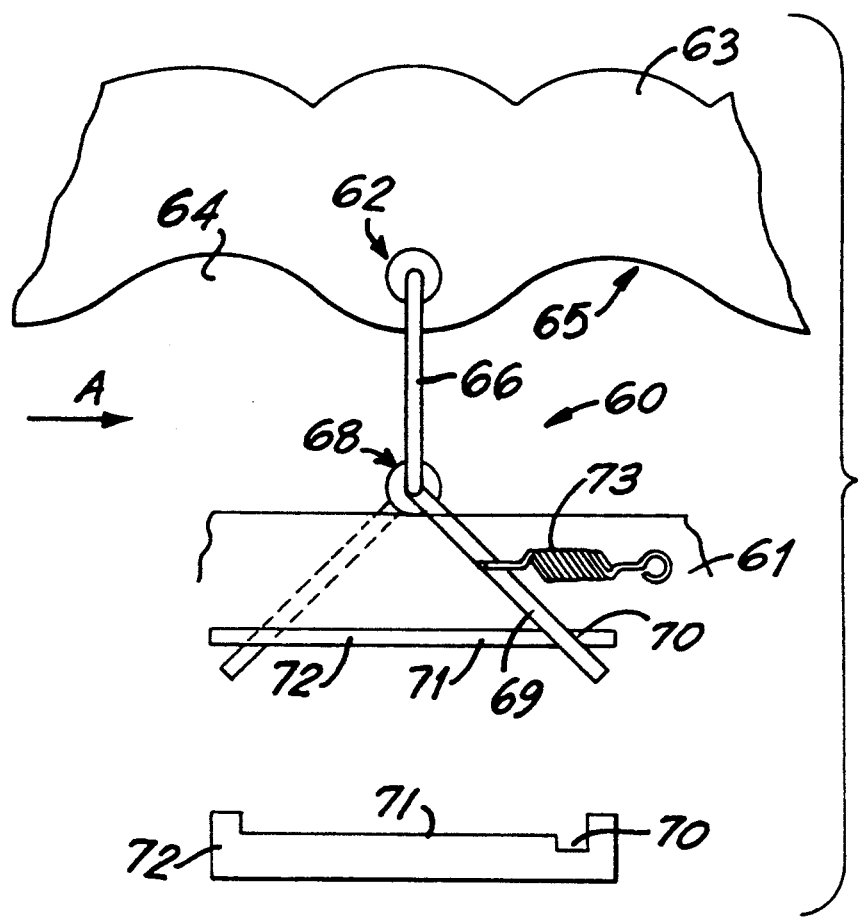
FIG. 7 is plan of an attachment according to another aspect of the invention for an end effector for clamping a workpiece part to be sewn by means of a gripper pad.
Figure 8:
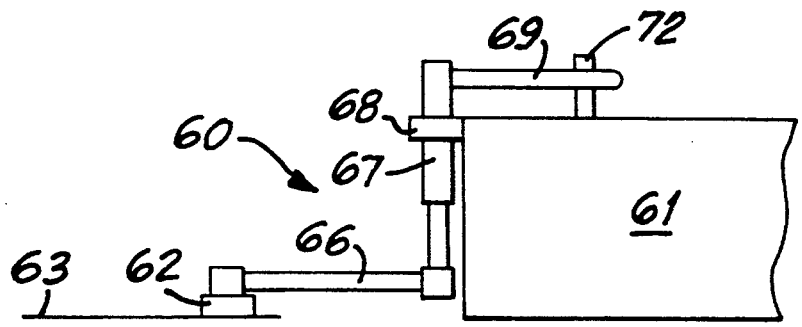
FIG. 8 is a view in the direction of arrow A in FIG. 7.

FIGS. 7 and 8 show an attachment device 60 which may be attached to an end effector 61. The device 60 comprises a gripper pad 62 for gripping scalloped lace 63 to be sewn to a fabric piece 64, the stitch line being indicated by reference numeral 65. The pad 62 is mounted at one end of a horizontal arm 66 connected to a vertical shaft 67 journalled for sliding and pivoting movement in a journal 68 attached to the end effector 61. The top of the shaft 67 is connected to a further horizontal arm 69 which, in the position shown in FIG. 7, rests in a slot 70 forming part of a cam surface 71 of a cam member 72. A spring 73 urges the arm 69 into the full line position shown in FIG. 7. In use, an upwardly sloping part in front of the sewing head of a sewing machine (not shown) moves relatively to the attachment device 60 along the stitch line 65 and engages beneath the arm 66. As the sewing machine part advances, the sloping part thereof lifts the arm 66 so that the arm 69 is moved out of the slot 70 and the pad 62 is raised clear of the lace 63. The sewing machine part, as it advances along the stitch line 65, pivots the arm 66 about the axis of the shaft 67 so that the pad 62 is swung clear of the stitch line 65 and the arm 69 is moved along the cam surface 71. Finally the sewing machine part clears the arm 66 and the spring 73 pivots the arm back into the slot 70, the gripper pad 62 swinging back over the lace 63 before finally dropping back down into contact with the lace in its original clamping position on the now sewn-on lace. A number of such devices 61 would be provided on an end effector, the pads of the various end effectors being moved sequentially out of contact and then back into contact with the lace as the sewing progresses along the lace. The attachment devices 60 may be provided on end effectors according to the present invention. The attachment device shown in FIGS. 7 and 8 can be used with any design of end effector or gripping device and not just one having the features set out in the following claim 1.

We claim:

1. A robot end effector comprising
   a rigid backing member comprising a lightweight composite panel of laminated construction having a honeycomb core,
   electrically conductive facing strip material arranged to contact a workpiece adjacent to the periphery of the workpiece and
   a resilient intermediate layer between the backing member and the facing strip material, there being at least one void space between the backing member and a plane containing the facing strip material.

2. A robot end effector according to claim 1, in which the resilient intermediate layer is made of a material which requires a force of from 80 to 120 kg/m² to compress it 1 mm.

3. A robot end effector according to claim 1, in which the intermediate layer is made of a foam.

4. A robot end effector according to claim 3, in which the foam is a high resilient grade of polyurethane foam.

5. A robot end effector according to claim 1, in which the width of the intermediate layer where it is adjoined to the backing member is greater than the width of the intermediate layer where it is adjoined to the facing strip material.

6. A robot end effector according to claim 5, in which the intermediate layer has a cross-sectional shape such that an inwardly facing side thereof is at an inclined angle to the backing plate.

7. A robot end effector according to claim 5, in which the intermediate layer has a cross-section of trapezoidal form.

8. A robot end effector according to claim 1, in which the backing member has at least one aperture therein.

9. A robot end effector according to claim 1, in which the resilient intermediate layer has a thickness of from 20 mm to 30 mm, and the facing strip material has a width of less than 20 mm.

10. A robot end effector according to claim 9, in which the facing strip material has a thickness of substantially 1 mm.

11. A robot end effector according to claim 1, in which the width of the facing strip material is no greater than the thickness of the intermediate layer.

12. A robot end effector according to claim 1, in which the facing strip material is made of a rubber containing electrically conductive particles.

13. A robot end effector comprising a rigid backing member, electrically conductive facing strip material arranged to contact a workpiece adjacent to the periphery of the workpiece and made of rubber containing electrically conductive particles, and a resilient intermediate layer between the backing member and the facing strip material, there being at least one void space between the backing member and a plane containing the facing strip material.

14. A robot end effector according to claim 13, in which the rigid backing member comprises a lightweight composite panel.

* * * * *